United States Patent
Jakob (10) Patent No.: US 7,921,268 B2
(45) Date of Patent: Apr. 5, 2011

(54) METHOD AND SYSTEM FOR FUNCTION-SPECIFIC TIME-CONFIGURABLE REPLICATION OF DATA

(76) Inventor: Holger Jakob, Finsterhennen (CH)

( * ) Notice: Subject to any disclaimer, the term of this patent is extended or adjusted under 35 U.S.C. 154(b) by 482 days.

(21) Appl. No.: 11/939,633

(22) Filed: Nov. 14, 2007

(65) Prior Publication Data

US 2009/0016190 A1    Jan. 15, 2009

Related U.S. Application Data

(60) Provisional application No. 60/949,357, filed on Jul. 12, 2007.

(51) Int. Cl.
G06F 12/00    (2006.01)

(52) U.S. Cl. ........ 711/162; 711/112; 711/114; 707/619; 707/633; 707/634; 707/640; 707/654; 707/659

(58) Field of Classification Search .................. 711/162, 711/112, 114; 707/619, 633, 634, 640, 654, 707/659
See application file for complete search history.

(56) References Cited

U.S. PATENT DOCUMENTS

| | | |
|---|---|---|
| 6,260,125 B1 | 7/2001 | McDowell |
| 6,807,632 B1 | 10/2004 | Carpentier et al. |
| 6,976,165 B1 | 12/2005 | Carpentier et al. |
| 7,159,070 B2 | 1/2007 | Kilian et al. |
| 7,162,571 B2 | 1/2007 | Kilian et al. |
| 7,249,251 B2 | 7/2007 | Todd et al. |
| 7,263,576 B2 | 8/2007 | Todd |
| 7,281,084 B1 | 10/2007 | Todd et al. |
| 7,320,059 B1 | 1/2008 | Armangau et al. |
| 7,350,041 B1 | 3/2008 | Armangau et al. |
| 7,366,836 B1 | 4/2008 | Todd et al. |
| 7,376,681 B1 | 5/2008 | Todd et al. |
| 7,392,235 B2 | 6/2008 | Armangau et al. |
| 7,401,093 B1 * | 7/2008 | Hamilton et al. ..................... 1/1 |
| 7,428,621 B1 | 9/2008 | Todd et al. |
| 7,430,645 B2 | 9/2008 | Todd et al. |
| 7,444,389 B2 | 10/2008 | Kilian et al. |
| 7,467,265 B1 * | 12/2008 | Tawri et al. ................... 711/161 |
| 7,539,813 B1 | 5/2009 | Todd et al. |
| 7,580,961 B2 | 8/2009 | Todd et al. |
| 7,698,516 B2 | 4/2010 | Todd et al. |
| 7,765,191 B2 | 7/2010 | Armangau et al. |

(Continued)

FOREIGN PATENT DOCUMENTS

| | | |
|---|---|---|
| WO | WO 99/50747 | 10/1999 |
| WO | WO 02/25445 | 3/2002 |

OTHER PUBLICATIONS

Denehy et al., "Bridging the Information Gap in Storage Protocol Stacks," USENIX Association, pp. 1-14, Jun. 10, 2002.*

*Primary Examiner* — Stephen C Elmore (74) *Attorney, Agent, or Firm* — MOETTELI & Associés SàRL (57) ABSTRACT

The system and method of the invention provides for function-specific replication of digital data, such as files or objects, with a configurable time delay for each function to be replicated. The system includes a source storage system from which digital data is to be replicated, a destination storage system(s) to which the digital data is being replicated, a replication management module for managing the function specific replication delay and the data replication between the source storage systems and the destination storage system(s).

11 Claims, 10 Drawing Sheets

U.S. PATENT DOCUMENTS

| | | |
|---|---|---|
| 7,801,920 B2 | 9/2010 | Todd et al. |
| 7,805,470 B2 | 9/2010 | Armangau et al. |
| 2005/0125411 A1 | 6/2005 | Kilian et al. |
| 2005/0193084 A1 | 9/2005 | Todd et al. |
| 2006/0004689 A1 | 1/2006 | Chandrasekaran et al. |
| 2006/0031653 A1 | 2/2006 | Todd et al. |
| 2006/0235821 A1 | 10/2006 | Armangau et al. |
| 2006/0235893 A1 | 10/2006 | Armangau et al. |
| 2006/0235908 A1 | 10/2006 | Armangau et al. |
| 2006/0294115 A1 | 12/2006 | Armangau et al. |
| 2006/0294163 A1 | 12/2006 | Armangau et al. |
| 2007/0050415 A1 | 3/2007 | Armangau et al. |
| 2008/0016300 A1* | 1/2008 | Yim et al. .................... 711/162 |
| 2008/0177963 A1* | 7/2008 | Rogers .......................... 711/162 |

* cited by examiner

FIG 1.

PRIOR ART

FIG. 2

PRIOR ART

METHOD AND SYSTEM FOR FUNCTION-SPECIFIC TIME-CONFIGURABLE REPLICATION OF DATA

CROSS REFERENCE TO RELATED APPLICATIONS

This application claims priority to U.S. provisional application No. 60/949,357, of the same title, filed Jul. 12, 2007, the content of which is incorporated by reference hereto.

FIELD OF THE INVENTION

The present invention relates generally to storage systems, which are able to store digital objects or files. More specifically, the present invention relates to data replication systems and methods.

BACKGROUND OF THE INVENTION

Several storage systems provide data replication capabilities for the purpose of either logical error recovery or disaster tolerance, which requires respectively high availability and relatively high integrity. Storage systems allow block, object or file access and provide a means to replicate data from source data storage to a backup data storage system. The method and system for function-specific time-configurable replication of data applies to storage systems allowing object and file access only.

Object-based storage arrays allow applications to integrate a set of commands, typically called an Application Programming Interface (API). The API allows the creation of new objects as well as the modification of existing objects. For Storage arrays that are also providing Write-Once-Read-Many (WORM) functionality, it may not be possible to modify already stored objects.

File-oriented storage arrays provide users or applications the possibility of accessing the system using a file-share. These storage systems provide access to the installed capacity using standard file sharing protocols like NFS (meaning Network File System) or CIFS (meaning Common Internet File System). These protocols may also have proprietary extensions to implement special functionality like WORM file systems or WORM shares.

The storage array may also be a standard server running an operating system available from one of the many providers of operating systems. The server would provide access to the available capacity using file shares similar to a file-oriented storage array.

The set of command functions for object or file oriented storage arrays usually contains functions like write, read, delete, update, write-disable until expiration date or delete before expiration date. The exact implementation however is dependent on the storage array. Each individual function on a storage array is described in the array specific documentation. If the storage array provides special functions that are not standardized in the protocols like NFS and CIFS the array vendor provides a detailed description of the required integration with the storage array.

Existing object or file oriented storage arrays already provide ways to replicate data between two or more storage arrays. The replication may be implemented on the storage array or on a dedicated system that performs the replication of data.

Existing systems also allow replicating changes to the target system. The replication may include or exclude specific functions. If a function is replicated, it is generally replicated as soon as possible.

The changes made to objects or file systems are made by the users or applications making these changes. Users may typically access file oriented storage systems and perform the normal operations like writes, reads, updates or deletes of files. Applications may access both object and/or file oriented storage arrays. As applications are programmed, they may implement rules to make data read-only up to a certain expiration date. The capability to generate new versions of documents and other advanced functionality exist in various solutions available on the market. Among these advanced storage array functionalities in the prior art are applications which also use WORM functionality.

Data replication functionalities of current replication systems are based on fixed, pre-established and non-configurable delays. Consequently, deletion of data that is referred to by otherwise non-deleted files, objects or applications prevents recovery of such data.

U.S. Pat. No. 6,260,125 to McDowell, the content of which is incorporated herein by reference thereto, discloses an asynchronous disk mirroring system for use within a network computer system, wherein a write queue operates to delay the time of receipt of write requests to storage volumes, with a view to increasing data replication performance. The write queues include several write buffers, wherein the write requests pass through the write queue in a first-in, first-out (FIFO) sequence; and so transmission of write requests may be subject to a time-delay by either a pre-determined amount of time or when the storage or write buffer is full. McDowell also discloses a log file configured to receive the delayed write requests, for log-based mirror reconstruction and check-pointing of the mirrored volumes. The replication of data by the system of McDowell is limited to updating and writing and does not provide function-dependant data replication, nor does it provide configurable functions such as delete or write-disable.

Patent application number WO 99/507/747 to Arnon, the content of which is incorporated herein by reference thereto, discloses a method and apparatus for asynchronously updating, a mirror of data from a source device, whose purpose is to prevent the overwriting of data on a source storage that has not yet been committed to a target storage system. The Arnon method and apparatus addresses the need for data integrity but does not allow a user to configure replication operations on a function base or time base, and only prevents overwrite of data on a source storage in the situation where data has not been replicated on target storage.

Current solutions do not allow synchronizing or configuring the time frame within which a data restore is possible with replication of changes on object or file based storage arrays.

User-controlled data replication of the prior art allows users to control whether replication occurs, but not when it occurs. A system designed by Denehy et al. (*Bridging the Information Gap in Storage Protocol Stacks,* Denehy and al., Proceedings of the general track, 2002, USENIX annual technical conference, USENIX Association, Berkeley Calif., USA, the content of which is incorporated by reference thereto) allows a user to prioritize data replication actions on specific files based on file designations such as "non-replicated", "immediately replicated" or "lazily replicated." However, such configuration only addresses system performance needs for short lifetime data storage systems, and does not address the needs for system integrity and accident recovery.

Given the current interrelationship of data stored on networks, what is needed therefore is a way of ensuring that deleted data on devices that are not backed up may be recovered as long as a user wishes to preserve the ability to restore data including references to the deleted data of such devices from backups.

What is needed is a user-controlled data replication system that allows users to control both whether and when replication occurs.

What is needed is a system or method that allows synchronizing or configuring the time frame within which a data restore is possible and which enables replication of changes on object or file based storage arrays.

Further, what is needed is a system which more fully addresses the need for system integrity and accident recovery.

SUMMARY OF THE INVENTION

The system and method of the invention provides for function-specific replication of digital data, such as files or objects, with a configurable time delay for each function to be replicated. The system includes a source storage system from which digital data is to be replicated, a destination storage system(s) to which the digital data is being replicated and a replication management module for managing the function specific replication delay and the data replication between the source storage systems and the destination storage system(s).

The replication management module of the invention provides functionality allowing: (1) configuration of a delay at which a specific function will be performed on the destination storage system when data stored on the source storage system, modified by the function, is replicated on corresponding data oil the destination storage system; (2) the replication of the function performed on data stored on the source storage system with the configured delay to the destination storage system; and (3) querying of function-specific changes to data of the source storage system in a given timeframe.

It is an object of the invention to provide a system and method which meets the business need of combining both data replication for high availability and disaster tolerance as well as recovering data due to logical errors.

It is another object of the present invention to provide a system for function specific replication of digital data that is adaptable to a wide range of storage system architectures, including object-based storage arrays having an application programming interface, file-based storage arrays, and standard computer servers.

It is a further object of the present invention to provide a system for function specific replication of digital data that can be implemented in hardware abstraction and virtualization software.

It is yet a further object of the present invention to provide a system for function specific replication of digital data that is easily scalable to several destination storage systems, and even large number of destination storage systems.

In an advantage, the system and method solves the business need of combining both data replication for high availability and disaster tolerance as well as recovering data due to logical errors.

In another advantage, the combination of object or file replication for disaster tolerance with the ability to configure the delay of the replication for each function that can be performed on the stored objects or files provides both disaster tolerance and logical error recovery.

In another advantage, the method makes replication of data dependent on the function that was performed on the data as well as makes the delay of the replication time-configurable, in that the replication of new objects or files can be performed as quickly as possible but the replication of another function like deletes of objects or files may be delayed for a configurable amount of time, thereby providing a solution for both disaster tolerance and logical error recovery. This allows the customer to ensure that data on storage arrays is recoverable for the same time that a restore and recovery of references to these objects or files is possible. Such system thus guarantees that all objects and files are available as long as references to that data may be restored from backups.

In another advantage, the system and method of the invention delays the deletion of data from the source storage array for a N period until the data is also deleted from the target storage array, thereby allowing the restoring of an application database using the standard recovery procedure as well as providing the possibility of accessing the previously deleted data on the secondary storage array without having to have a complete backup of all data having ever been written to the source storage array. Once the standard recovery procedure is also no longer capable of recovering data, the file or object referenced can also be deleted on the target storage array.

DETAILED DESCRIPTION OF PREFERRED EMBODIMENTS

Figure 1:
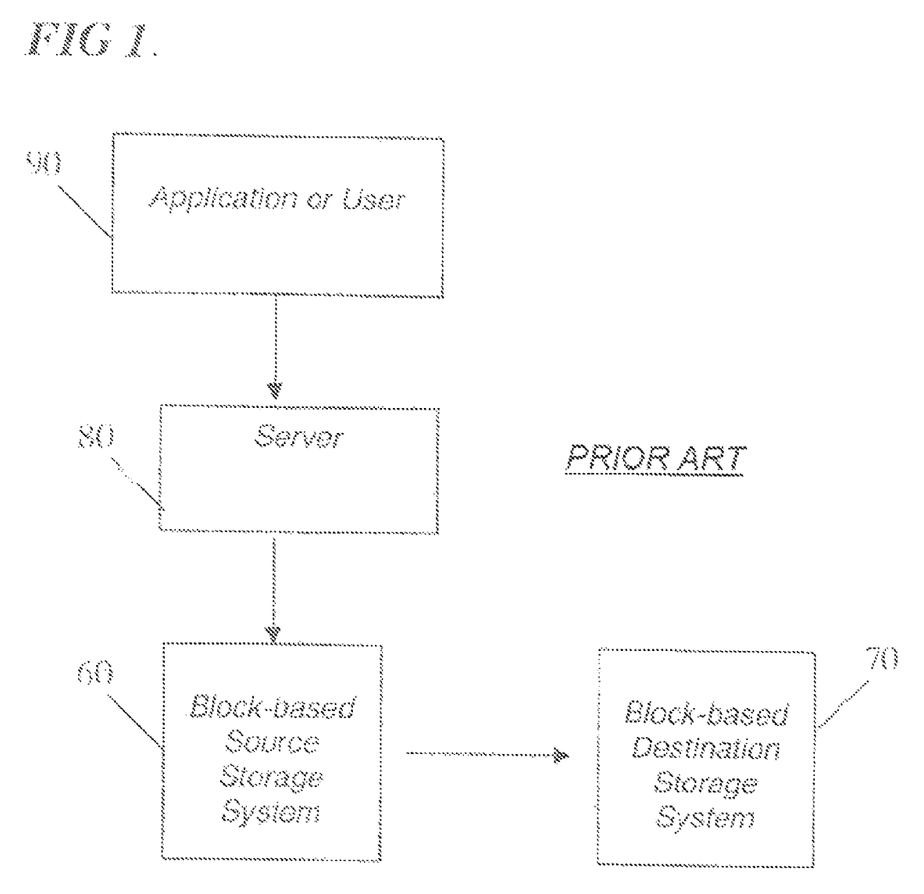
FIG. 1 is a schematic diagram of a block-based storage system of the prior art where the replication management module is located in the source storage array.

Referring now ow to FIG. 1, a block-based source storage system 60 of the prior art provides a server 80 access to a certain disk capacity. The operating system installed on server 80 possesses the knowledge of where and which object or file lies within this disk capacity. This information can, for example, be stored in the File Allocations Table or I-nodes. An application or User 90 accessing a file on such a server 80 would therefore issue any function-based calls like write, update and delete to that server 80 who in turn knows where the file is located on the block-based source storage system 60. Any function performed by an application or user 90 will result in an update or read of a block on the disk capacity available to the server 80. The replication of writes or update of a block on the source storage array 60 is embodied in the source storage system 60.

Figure 2:
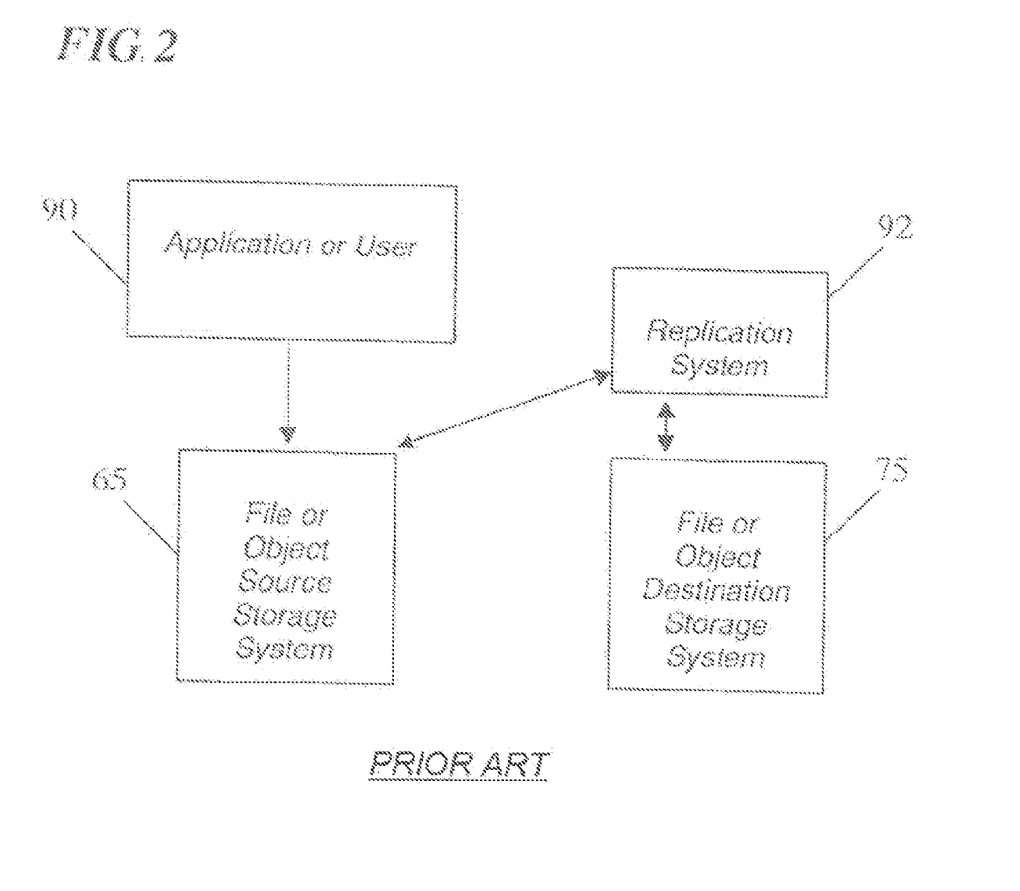
FIG. 2 is a schematic diagram of an object or file based storage array of the prior art where the replication management module is implemented in a separate system.

Referring now to FIG. 2, object or file based storage arrays 65 and 75 provide the functionality of the server 80 mentioned above directly from within the storage array 65 and 75. The application or user 90 accessing a file issues the functions directly to the storage array. For the purpose of abstraction, it server 80 providing file based access to the available disk capacity on source storage array 65 is also contained in the file based storage arrays because whether he accesses the server or the storage array is not differentiable by an application or user. To the application or user, they both provide the same functionality of file level access using file access protocols like CIFS or NFS. The replication from the file or object based source storage system 65 to the corresponding target storage array 76 is embodied in the source storage system 65

Referring now to FIGS. 3 to 6, a system 10 for function specific replication of digital data, such as files or objects, allows for a configurable time delay for each function to be replicated. The system 10 includes a source storage system 20 for archiving digital data, at least one destination storage system 30 for archiving digital data, a replication management module 40 for managing the function specific replication delay and the data replication between the source storage systems and at least one destination storage system. A replication monitoring database 42 may optionally be used as well.

The system 10 provides at least one standard data related function of a group of functions including: write, read, delete, update, modify, write-disable, write disable until expiration date, delete-disable and delete-disable until expiration date.

The replication management module 40 provides several novel features. One feature allows for the configuration of a delay at which a specific function of data stored on the source storage system is replicated on corresponding data on the destination storage system. Another feature allows for replication of the function performed on data stored on the source storage system with the configured delay to the destination storage system. Still another feature allows for querying function-specific changes to data of the source storage system in a given timeframe.

As for the source storage system 20 for replicating digital data, at least one destination storage system 30 is based on one of the following architectures: object-based storage arrays comprising an application programming interface, file-based storage arrays, or a computer server, comprising memory, a Central Processing Unit (CPU) and an operating system.

The system 10 provides access to storage systems based on either of the following architectures: object-based storage systems having an application programming interface, file-based storage arrays, and a computer server, including memory, a CPU and an operating system.

Figure 3:
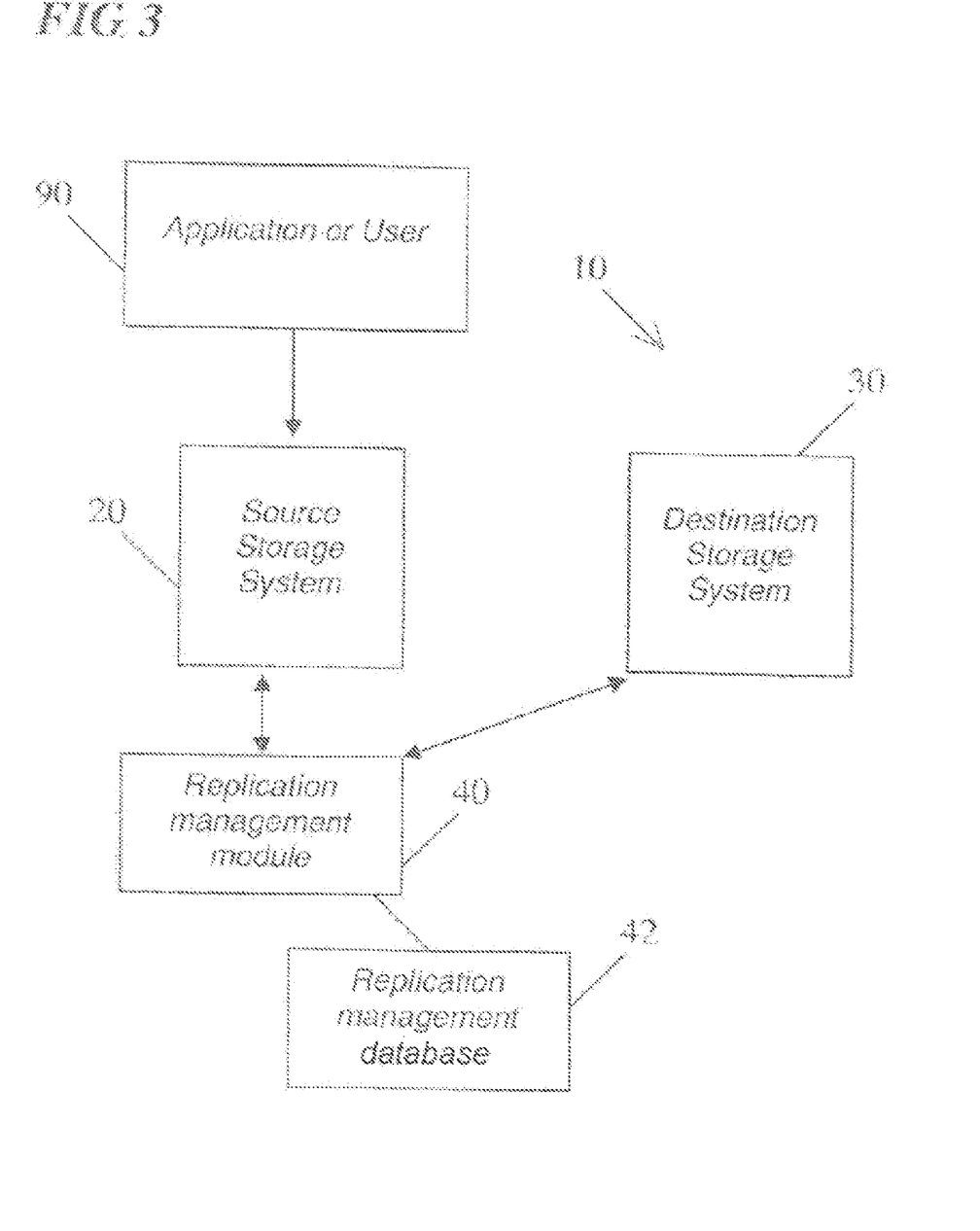
FIG. 3 is a schematic diagram showing the elements of the system for function specific replication of digital data with a configurable time delay.
Figure 4:
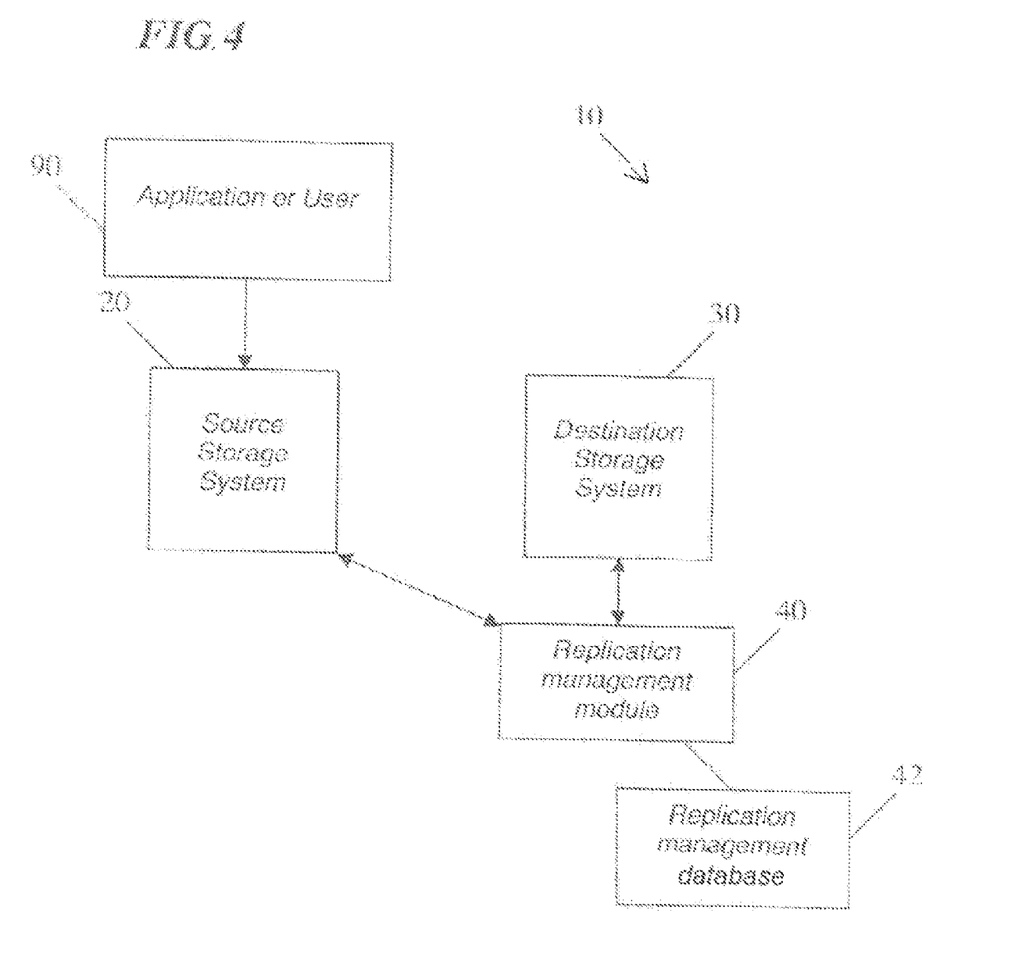
FIG. 4 is a schematic diagram showing the elements of the system for function-specific replication of digital data with a configurable time delay.

The system 10 is adaptable to several different system configurations. Referring now to FIG. 3, a configuration where the replication management module 40 is located on the source storage system 20 is shown. The information about functions performed by applications or users 90 on objects or files stored is gathered by the replication management module from the source storage system 20 and used to replicate each function performed with a configurable delay to the Destination Storage system 30. The information gathered may optionally be stored for future reference in the replication monitoring database 42.

Figure 5:
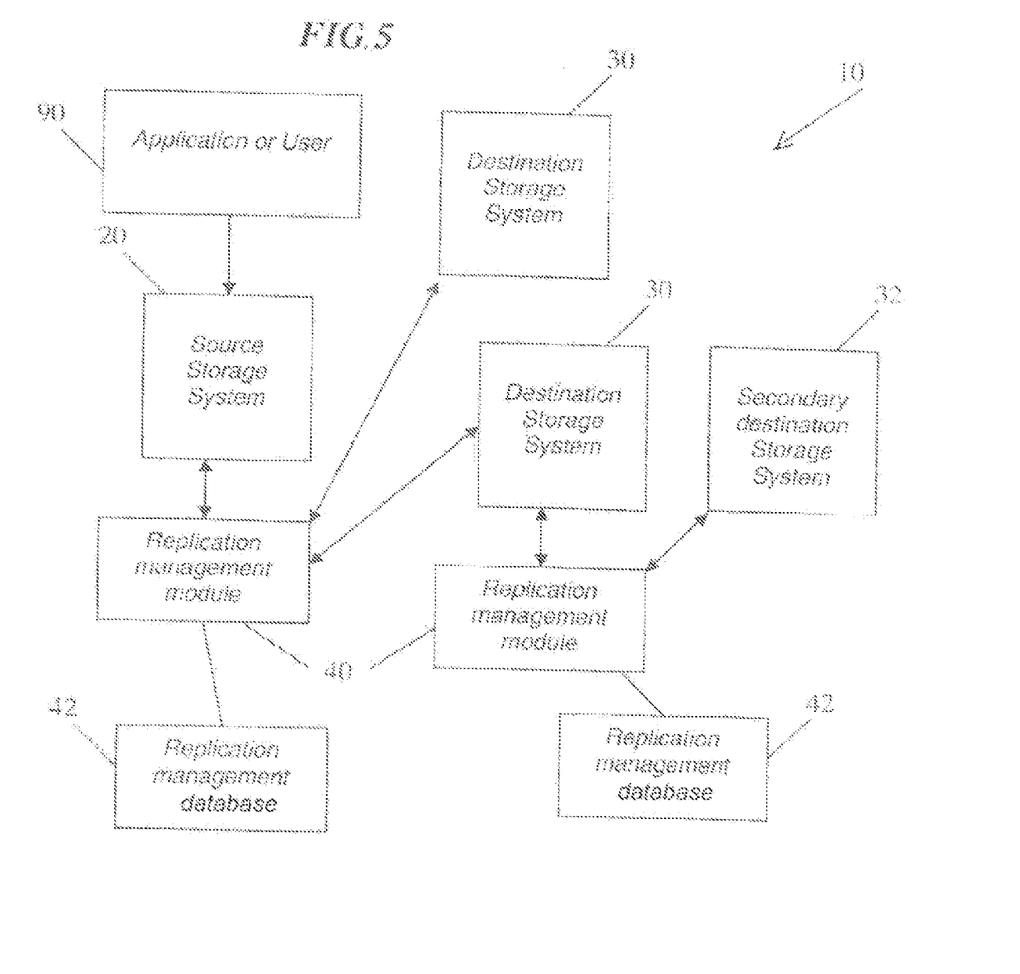
FIG. 5 is a schematic diagram showing the elements of the system for function specific replication of digital data with a configurable time delay, having several destination storage systems.

Referring again to FIG. 4 a configuration where the replication management module 40 is located on the destination storage system 30 is shown Referring now to FIG. 5, a configuration is shown with several destination storage systems 30, one being a secondary destination storage system 32. The Replication management module 40 gathers the information for function-specific replication from the Source storage system 20 and replicates to multiple Destination Storage systems 30. A Destination storage system 30 may be used by a second Replication management module as the source storage system to replicate to a secondary destination storage system 32.

Figure 6:
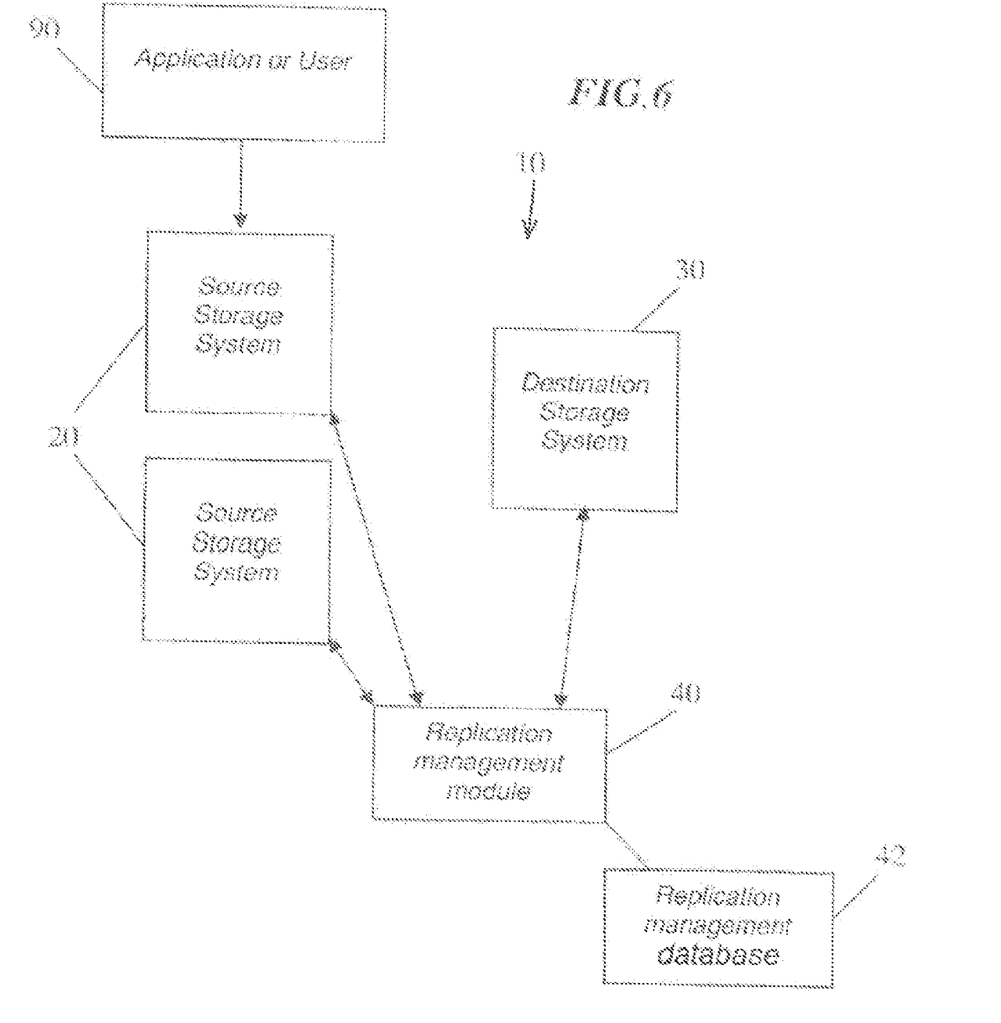
FIG. 6 is a schematic diagram showing the elements of the system for function specific replication of digital data with a configurable time delay, having several source storage systems.

Referring now to FIG. 6, a configuration with several source storage systems 20 is shown. One replication management system 40 is gathering information from multiple source storage systems 20. All functions performed on multiple source storage systems 20 are replicated to a common destination storage system 30.

The source storage system 20 or the destination storage system 30 are file-based storage arrays, including a server 80 which enables file based access to the available storage capacity of the storage array.

Figure 7:
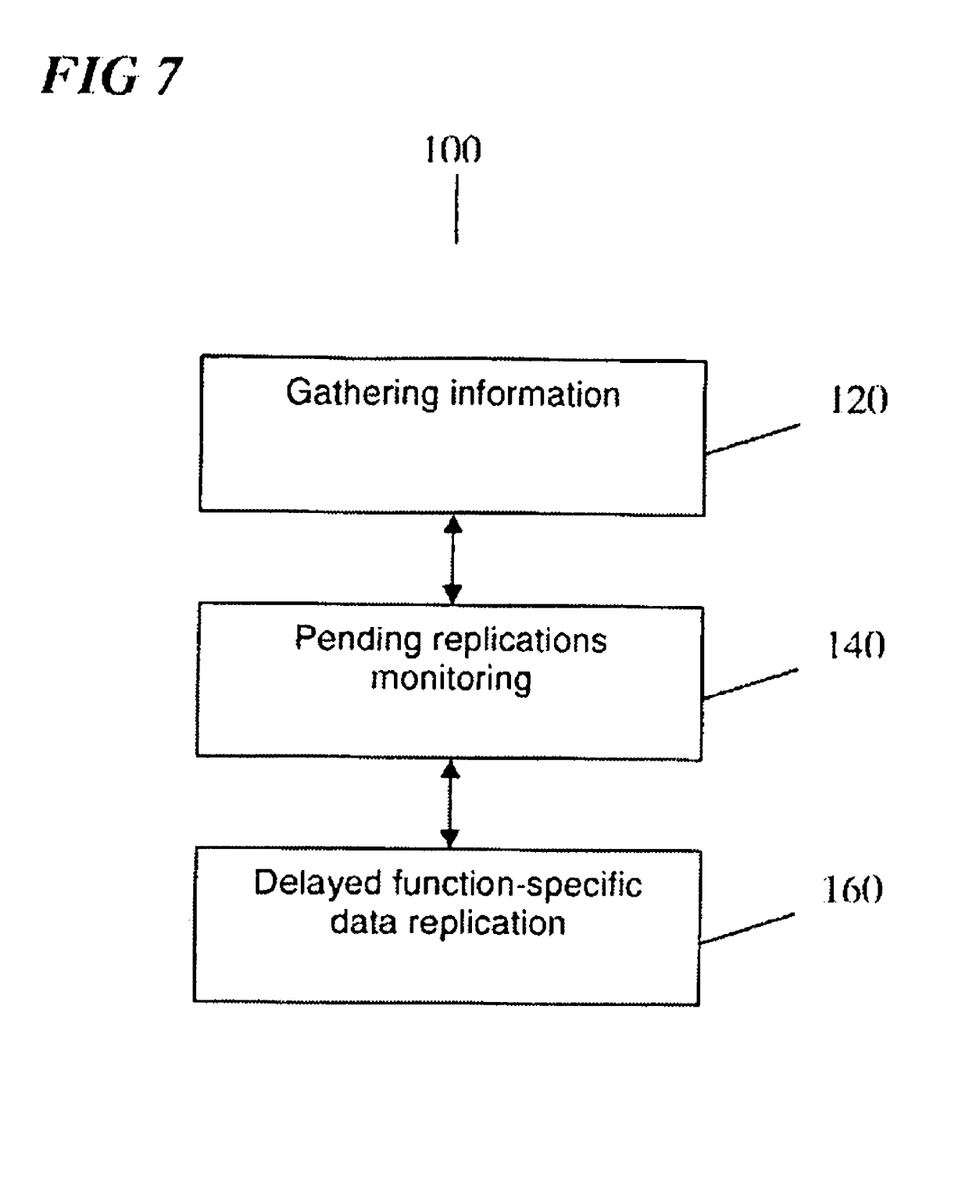
FIG. 7 is a flow chart showing the necessary main steps to implement a function-specific data replication system of the present invention.

The method 100 for implementing a function-specific replication of data using system 10, as shown in FIG. 7, involves three parallel functions to be performed at the same time: Gathering information 120, Pending replications monitoring 140, and Delayed function-specific data replication 160.

Figure 8:
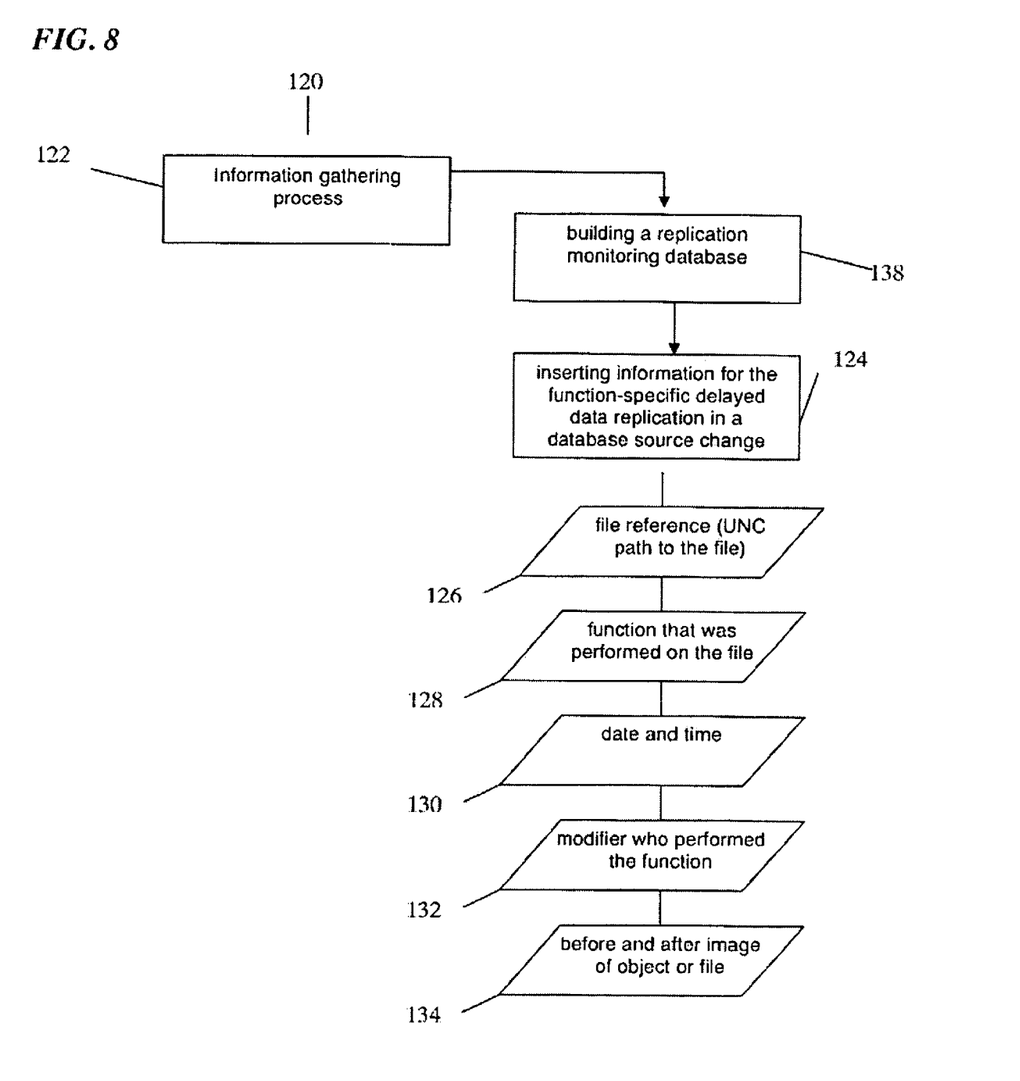
FIG. 8 is a flow chart showing the steps of the information gathering process.

FIG. 8 shows the gathering of information 120 on functions that were performed on data stored on a source storage system, is achieved by:

running an information gathering process 122 using information gathering software, and optionally building a replication monitoring database 138 consisting of information on the data and functions that were performed on data stored on a source storage system.

The running of an information gathering process includes the substeps of:

inserting information 124 for the function-specific delayed data replication in a database source change table, directly from the information gathering software, wherein the information that the information gathering software inserts into the database are:

the file reference 126 in form of the UNC path to the file, the function 128 that was performed on the file, the date and time 130 the function was performed, optionally the modifier 132 who performed the function, and optionally a before and after image, depending on the class of storage array.

For storage systems that provide information on the authors of changes, data about the originating applications or users, the replication management module can be used to further specify the granularity on which the function-specific data replication should act. For example, the module would allow the deletion of commands from a Securities and Exchange Commission (SEC) compliant application as quickly as possible to ensure that content is deleted once. it is permissible under the SEC rules to do so and to delay the replication of a delete from a file archive application that does not fall under regulatory requirements.

For File based storage arrays, a differentiation based on a part of the Universal Naming Convention UNC path may provide similar functionality. An application accessing the share \\server 1\share 1 can be functionally replicated differently than users accessing \\server 1\share 2 or \\server 2\share 1.

For source storage arrays 20 that do not allow sending event based information of the functions performed, the interval in which the information gathering takes place must be specified.

The inputs into the system and method of the invention implementing the function-specific data replication are gathered in a Graphical user interface and stored in the replication monitoring database configuration input table.

The possibility of specifying more than one destination storage system 30 also allows replicating functions with a different delay for each target system.

In order to implement function-specific replication including a configurable time delay, the information gathering process must provide a means for monitoring pending replications and for determining the delay or exact time to replicate the function. The replication time to replicate a functional change may be stored in the replication monitoring database 42 and will be used by the pending replications monitoring, process 140 and the delayed function-specific data replication process 160.

Tracking of which function was performed on a storage array is dependent on the functionality that the specific storage array provides. The functionality of the storage array also defines the granularity that can be provided to the user of the application.

The existence of the replication monitoring database 42 with all of the required information stored also allows changing the delay with which the replication of a function should be performed. The replication time in the outstanding replications table can be changed for changes that are not yet replicated. The pending replications monitoring process 140 takes into account the changed replication time to initiate the delayed function-specific data replication 160. Depending on the environment, it allows increasing or decreasing Of the delay based on the customer's actual needs. Based on the information that can be queried from the storage systems, the delay might also be configured independently for each application, file system or subset of objects.

The implementation of the system and method for function-specific replication of data requires different versions of the software. Function-specific replication between standard servers running standard operating systems cannot be implemented the same way as replication between proprietary API based storage systems. Further detail is provided below of the different functions that need to be present independent of the storage array.

The replication monitoring database 42 must be configured for each source storage system, notably with regard to identification of the information to be gathered and tracked, so as to enable the data replication method of the present invention to be used. As an example: An object based storage system does not require the same information as a file based storage system for the replication of a chance to be performed.

The required information is condensed into the least amount of data necessary to implement a function-specific and time delayed replication of data.

In order to reduce the complexity of today's storage environments, the virtualization of infrastructures is rapidly being adopted in the market. Storage virtualization software abstracts the physical storage systems into logical entities. Virtualization is a good way to mask ongoing migrations or systems being replaced with newer ones. Virtualization software thus knows which function is being performed on which file or object. The implementation of replication features is possible in the virtualization layer.

The way the function-specific information is retrievable from a storage array depends on the functionality that is implemented on a storage array. It also depends on other functionality aspects like the availability to install and run a process on that array.

Today, object or File oriented storage arrays are built based on two different approaches.

In a first approach, file oriented storage may be implemented using hardware that provides file level access based on standard operating systems. These operating systems, such as UNIX, Linux or Windows, allow the installation of additional software that can be used to facilitate the information gathering process.

In a second approach, object and File oriented storage arrays may be implemented using proprietary operating systems like Data "ONTAP", "DART" or "CENTRASTAR". To allow maximum flexibility in changing the time delay for the function-specific replication of data, all detected changes are gathered as quickly as possible. This means that a deletion of content is recorded once it is discovered by the information gathering process. This ensures that increasing or decreasing the delay does replicate all outstanding modifications even when changes are made to the time interval. It also allows updating the replication monitoring database with a new time of replication for all Function-specific replications not yet completed.

Standard Operating System Based Storage

Standard Operating systems based storage allows the installation and creation of additional software and services on the server that provides the storage services in the network. The information gathering software runs as such a process on the storage array resp. storage server. Changes in the file systems may easily either be intercepted or detected and the required information for the function-specific delayed data replication may be inserted in the database source change table directly from the information gathering software.

Proprietary Storage Systems

The implementation of the information gathering process for proprietary storage systems must at least provide the function-specific information for the replication monitoring process. There are two general approaches that need to be differentiated depending on the class of the storage array.

Figure 9:
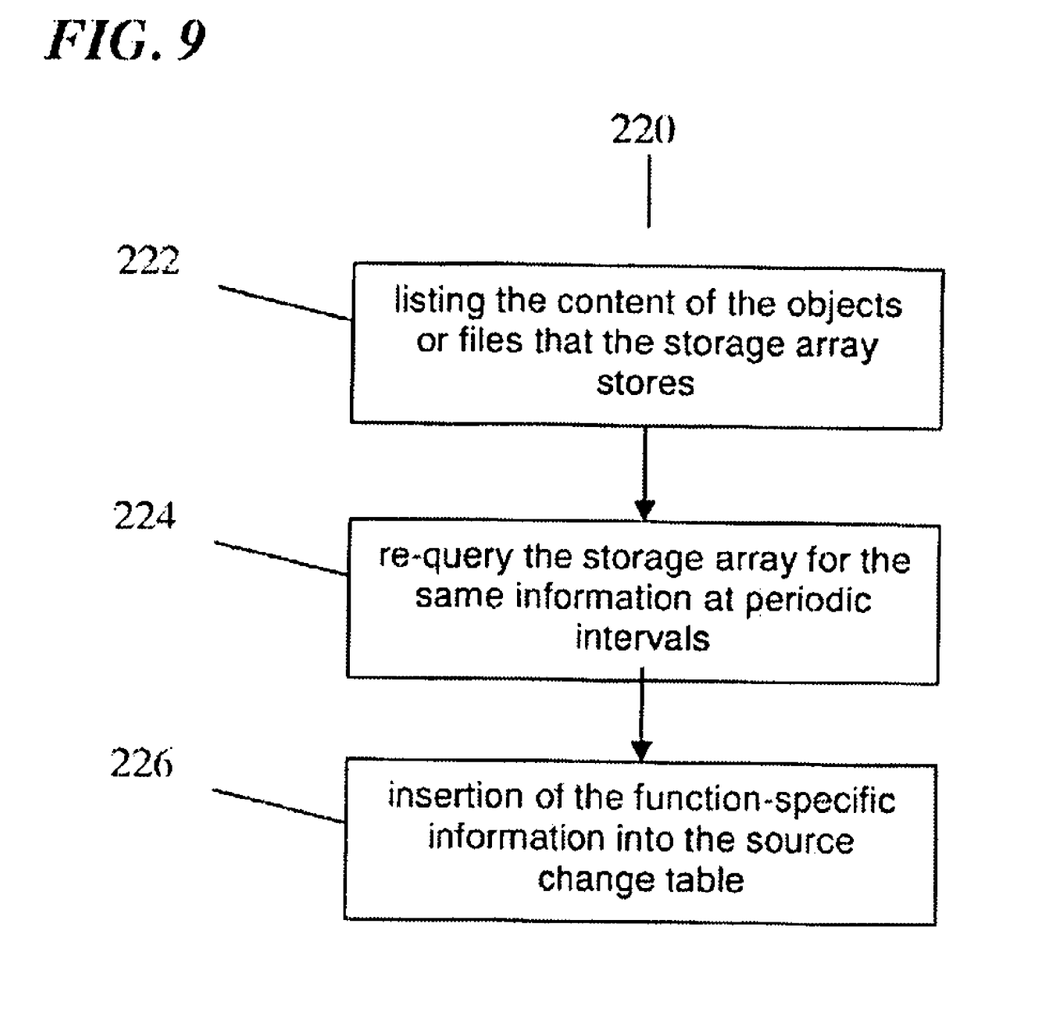
FIG. 9 is a flow chart showing the steps for implementing the information gathering process for proprietary storage systems of a first class of storage arrays which does not allow querying the array for changes that were made to the objects or files that are stored on the array.

A first class of storage arrays 220 does not allow querying the array for changes that were made to the objects or files that are stored on the array. In this situation, the information gathering process of the system implementing the function-specific delayed data replication involves the following three steps.

The first step 222 is listing the content of the objects or files that the storage array stores. The information stored also should include the additional information that the storage array provides for each object or file. For files, a good example would be to store the creation and modification information.

The second step 224 is to re-query the storage array for the same information at periodic intervals. The newly retrieved information can be compared with the previously stored information of all objects or files in the database. Newly stored files represent the first write of an object. Objects 110 longer present are an indication for a delete function performed on the object with an estimated time of execution of that command. A new modification date and time indicates a new write operation or an update of data.

The third step 226 is the insertion of the function-specific information into the source change table used by the replication monitoring to schedule the function-specific delayed replication of data.

Support of the function-specific data replication for storage arrays of this first category requires the implementation of a separate database or set of tables within the replication monitoring database to provide the required information of functions performed on the storage arrays.

This required information can be inserted into the replication monitoring database in the source change table.

Figure 10:
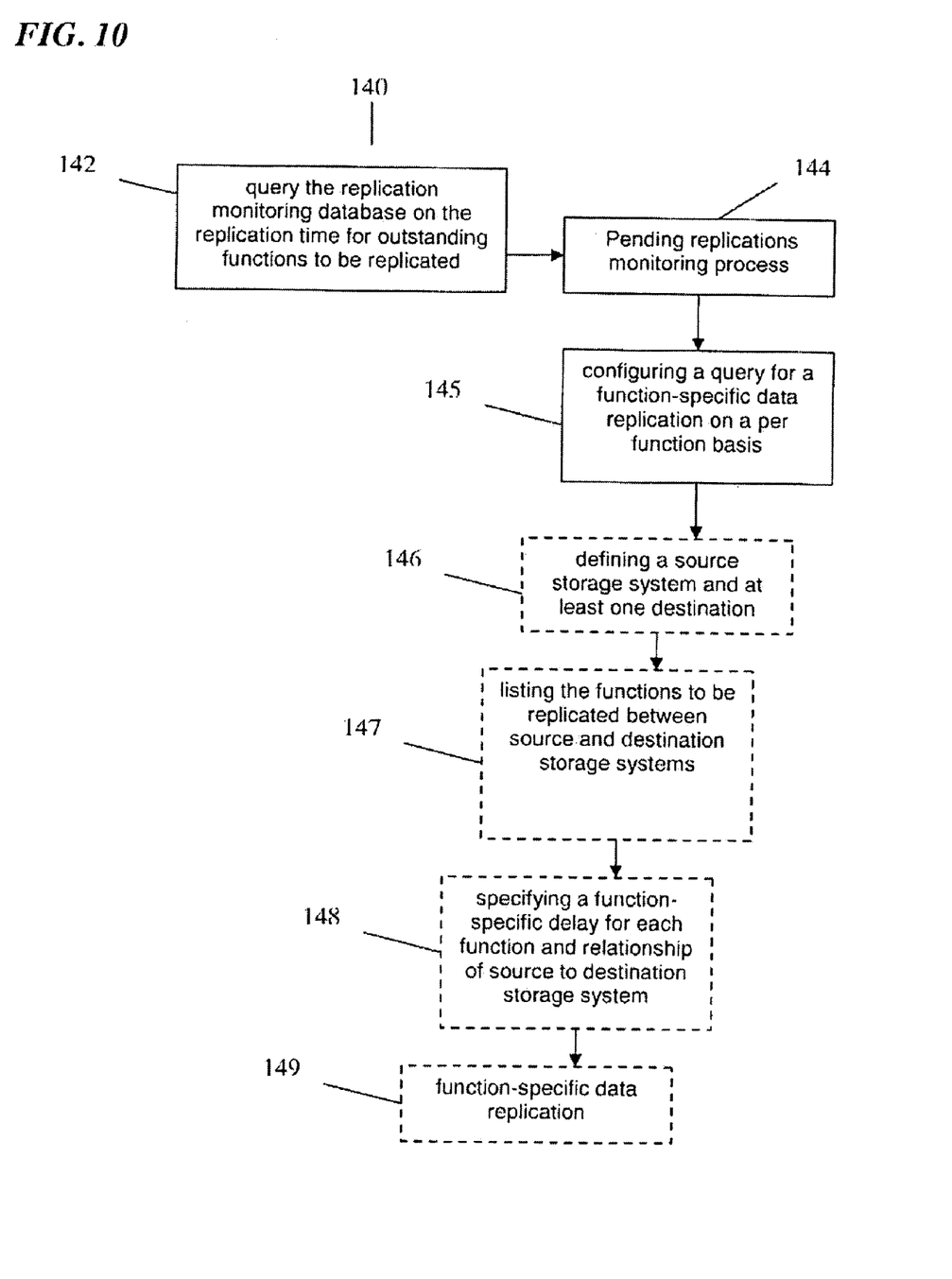
FIG. 10 is a flow chart showing the steps for implementing the information gathering process for proprietary storage systems of a second class of storage arrays for which the task of information gathering does not require the creation of an additional database.

In a second class of storage arrays, the task of information gathering does not require the creation of an additional database. The information gathering process continuously or in a scheduled way queries the storage arrays for changes made to objects or files and the additional information like when or who performed the function.

A good example in the category of object-based storage systems with this query functionality is "EMC CENTERA". The Query API allows the listing of content based on a timeframe the query is targeted to. The default query would provide a list of objects that may be used to find out when the object was written and who created it. With the same query functionality, the information gathering process can determine which objects were deleted in order to insert this information into the source change table of the replication monitoring database. The available proprietary storage systems today already provide replication possibilities based on independent software or software installed on the storage arrays. The implementation of a function-specific delayed replication on the storage systems has not been implemented yet.

Pending replications monitoring 140 is achieved as follows:
    query 142 the replication monitoring database on the replication time for outstanding functions to be replicated by running a pending replications monitoring process 144, including the sub-steps of:
      (a) configuring 145 a query for a function-specific data replication on a per function basis, using an input table accessible as a user interface, including the sub-steps of:
        i. defining 146 a source storage system and at least one destination storage system,
        ii. listing 147 the functions to be replicated between source and destination storage systems,
        iii. specifying a function-specific 148 delay for each function and relationship of source to destination storage system, and
        iv. function-specific data replication 149: this substep specifies the frequency at which the replication monitoring database is queried for outstanding data replications to be sent to the data replication processes The replication monitoring database provides all the information required to implement a function-specific delayed data replication.

The minimal information that must be available to implement a functional function-specific data replication is found on the four tables below.

Configuration Table
    Source: Source object or file based storage system that the function was performed on.
    Targets: Derived from the configuration input the target storage systems for each source target system.
    Function: Each function that allows to be detected.
    Delay: Delay for each function.
    Modifier: Provides possibility to add a higher degree of granularity for the data replication.

Source Change, Table
    Source: Source object or file based storage system that the function was performed on.
    Reference: Object or file (UNC) reference that the function was performed on.
    Function: Function that was performed.
    Time: Date and time the function was performed on the object or file.
    Modifier: Additional information like application, user, part of the UNC path to provide a more granular data replication.
    Completed: Once a functional change has been replicated the completion is stored in the Source Change Table. Simple yes/no flag for quick rebuilds of the outstanding replication table.
    Before/After Image: All information required for the replication of the functional change on the object or file if necessary for the class of storage array.

New entries in the Source Change Table trigger a function that inserts the corresponding entry or entries in the outstanding replication table.

Outstanding Replication Table
    The replication table is based on the configuration table and the continuous inserts into the source change table. Changes in the configuration may require the replication table to be rebuilt for entries in the source change table that were not yet completed.
    Target: Target system the replication needs to be replicated to.
    Reference: Object or file (UNC) reference that the function will be replicated to.
    Function: Function to be replicated.
    Replication Time: Date and time the function needs to be replicated at.
    Completion: Date and time the replication has been performed.

An update with a Completion triggers a function that creates an insert with the required information in the Replication Audit table and updates the completion flag in the source change table.

Replication Audit Table
    The audit table provides a means of proving which replications have already been performed.
    Source: Source object or file based storage system that the function was performed on.
    Reference: Object or file (UNC) reference that the function was performed on.
    Function: Function that was performed.
    Time: Date and time the function was performed on the object or file.
    Modifier: Additional information like application, user, part of the UNC path to provide a more granular data replication.
    Target: Target system the replication needs to be replicated to.
    Replication Time: Date and time the function needs to be replicated by.
    Completion: Date and time the replication has been performed.

Delayed function-specific data replication 160, for delaying a deletion of data from the source storage system until the data is also deleted from the destination storage system is achieved by configuring the time delay used for the function-specific replication of data, and by specification of the data replication interval, which may be very short or longer in duration.

Every time this interval expires, a process is looking into the outstanding replication table of the replication monitoring database. Entries that have a replication time with a date and time between the processes last and current invocation time need to be replicated.

The required information of the target system, a reference to the object or time and the function are directly stored in the outstanding replications table. Based on this information, the function is replicated based on the configured time delay by issuing the same function on the same object or file to the target system.

Once the function is performed on the object on the target system and the completion of the function is acknowledged, the completion date and time can be added in the outstanding replications table.

The replication of the functions performed needs to follow the same directions as described in the Input gathering section herein. The replication needs to be implemented for Standard Operating system based storage arrays differently than for proprietary storage systems and depends on the functionality of the storage arrays to be supported.

In an advantage, the method makes replication of data dependent on the function that was performed on the data as well as makes the delay of the replication time-configurable, thereby providing a solution for both disaster tolerance and logical error recovery. This allows the customer to ensure that data on storage arrays is recoverable for the same time that a restore and recovery from the production references of the objects or files is possible. Such system thus guarantees that all objects and files are available as long as references to that data may be restored from backups.

In another advantage, the system and method of the invention delays the deletion of data from the source storage array for a N period until the data is also deleted from the target storage array, thereby allowing the restoring of an application database using the standard recovery procedure and would also provide the possibility to access the previously deleted data on the secondary storage array without having to have a complete backup of all data having ever been written to the source storage array. Once the standard recovery procedure is also no longer capable of recovering data, the file or object referenced can also be deleted on the target storage array.

The patents and articles mentioned above are hereby incorporated by reference herein, unless otherwise noted, to the extent that the same are not inconsistent with this disclosure.

Other characteristics and modes of execution of the invention are described in the appended claims.

For File based storage arrays, a differentiation based on a part of the Universal Naming Convention (UNC) path may provide similar functionality. An application accessing the share \\server1\share1 can be functionally replicated differently than users accessing \\server1\share2 or \\server2\share1.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

What is claimed is:

1. A system for function specific replication of digital data, such as files or objects, the system comprising:
   at least one destination storage system for replicating digital data,
   a replication management module which enables
      (a) configuration of replication time delay in which an individually configurable time delay is specified for the replication of each specific function, and
      (b) data replication between a source storage system and at least one destination storage system.

2. The system of claim 1, wherein the system is adapted to replicate digital data with an individually configurable delay after receiving a command selected from a group of commands consisting of write, read, delete, update, modify, write-disable, write disable until expiration date, delete-disable and delete-disable until expiration date.

3. The system of claim 1 wherein the replication management module enables:
   configuration of a delay at which a specific function to be performed on data stored on the source storage system is replicated on corresponding data on the destination storage system,
   replication of the function performed on data stored on the source storage system with the configured delay to the destination storage system, and
   querying function-specific changes to data of the source storage system in a given timeframe.

4. The system of claim 1, wherein the storage system is based on one of a group of architectures consisting of:
   object-based storage arrays,
   file-based storage arrays, and
   a computer server, comprising memory, a CPU and an operating system.

5. The system of claim 1, wherein the instructions of the replication management module are stored on one of either the source storage system or the destination storage system.

6. The system of claim 1, wherein the replication management module is configured to provide access to storage systems based on one of a group of architectures consisting of:
   object-based storage systems,
   file-based storage arrays, and
   a computer server, comprising memory, a CPU and an operating system.

7. The system of claim 1, wherein the replication management module optionally comprising a replication monitoring database.

8. A computerized process operating on a special purpose computer system, the process comprising instructions for
   (a) configuration of a time delay at which a specific function performed on data on the source storage array will be replicated to the destination storage array(s)
   (b) gathering information on functions that were performed on data stored on a source storage system, including the step of building a replication monitoring database consisting of information on the data and functions that were performed on data stored on a source storage system,
   (c) querying the replication monitoring database for a replication time for outstanding functions to be replicated by running a pending replications monitoring process, and (d) replicating the function performed on the source storage system to the destination storage system(s).

9. The process of claim 8, wherein the replication monitoring process comprises configuring a query for a function-specific data replication on a per function basis, using an input table accessible to the user via a user interface, comprising the steps of:
(1) defining a source storage system and at least one destination storage system,
(2) listing the functions to be replicated between source and destination storage system,
(3) specifying a function-specific delay for each function and relationship of source to destination storage system
(4) specifying the frequency at which the replication monitoring database is queried for outstanding data replications to be sent to the data replication processes,
(5) delaying function-specific data replication, including the sub-steps of configuring the time delay used for the function-specific replication of data, and specifying a data replication interval, thereby delaying a deletion of data from the source storage system until the data is also deleted from the destination storage system.

10. The process of claim 8, wherein the source storage system is a storage array comprising an operating system that provides file level access to data, from which information on functions that were performed on the data can be obtained, and which stores self-installing information gathering software which is adapted to install and run on a client computer.

11. The process of claim 10, wherein the step of gathering information comprises the steps of:
inserting information for the function-specific delayed data replication in a database source change table, directly from the information gathering software,
wherein the information to be inserted into the database by the information gathering software includes:
a file reference in form of the UNC path to the file,
the function that was performed on the file,
date and time the function was performed, and
optionally, the modifier who performed the function, and
a before and after image of the object or file modified by the function.

\* \* \* \* \*

UNITED STATES PATENT AND TRADEMARK OFFICE
CERTIFICATE OF CORRECTION

| | | |
|---|---|---|
| PATENT NO. | : 7,921,268 B2 | Page 1 of 1 |
| APPLICATION NO. | : 11/939633 | |
| DATED | : April 5, 2011 | |
| INVENTOR(S) | : Jakob | |

It is certified that error appears in the above-identified patent and that said Letters Patent is hereby corrected as shown below:

In Col. 3, line 33, replace the phrase "data oil the destination" with --data on the destination--.

In Col. 4, line 64, replace the phrase "Referring now ow to" with --Referring now to--.

In Col. 5, line 16, replace the phrase "For the purpose of abstraction, it" with --For the purpose of abstraction, a--.

In Col. 6, line 64, replace the phrase "deleted once. it is" with --deleted once it is--.

In Col. 7, line 59, replace the phrase "chance to be performed" with --change to be performed--.

In Col. 10, line 3, replace the phrase "Source Change, Table" with --Source Change Table--.

In Col 11, line 50, insert the following paragraph:

--Further, the invention should be considered as comprising all possible combinations of every feature described in the instant specification, appended claims, and/or drawing figures which may be considered new, inventive and industrially applicable.--.

Signed and Sealed this
Twenty-eighth Day of June, 2011

David J. Kappos
*Director of the United States Patent and Trademark Office*